United States Patent
Buck

(10) Patent No.: US 6,797,310 B2
(45) Date of Patent: Sep. 28, 2004

(54) "PEANUT BUTTER BATTER" PANCAKE MIX

(76) Inventor: Doris Lorraine Buck, 11-A Via Castilla, Laguna Hills, CA (US) 92653

( * ) Notice: Subject to any disclaimer, the term of this patent is extended or adjusted under 35 U.S.C. 154(b) by 114 days.

(21) Appl. No.: 10/081,683

(22) Filed: Aug. 29, 2002

(65) Prior Publication Data

US 2004/0043129 A1 Mar. 4, 2004

(51) Int. Cl.$^7$ .............................. A21D 10/04; A23L 1/38
(52) U.S. Cl. ........................ 426/653; 426/633; 426/552
(58) Field of Search ................................ 426/632, 633, 426/622, 552, 555, 653

(56) References Cited

U.S. PATENT DOCUMENTS

| | | | | |
|---|---|---|---|---|
| 3,947,599 A | * | 3/1976 | Mitchell, Jr. | 426/250 |
| 4,057,654 A | * | 11/1977 | Smith | 426/555 |
| 6,312,754 B1 | * | 11/2001 | Wong | 426/633 |

FOREIGN PATENT DOCUMENTS

| | | | |
|---|---|---|---|
| CA | 612 887 | * | 1/1961 |
| GB | 27 554 | * | 8/1898 |

OTHER PUBLICATIONS http://www.universalblanchers.com/pages/extracts; "Peanut Oils and Extracts", page created Dec. 4, 2001.*
http://www.universalblanchers.com/pages/granulation; "Peanut Granulation and Chopped Peanuts", page created Dec. 4, 2001.*
http://www.nps.gov/gwca/expanded/peanut.htm; "List of By–Products from Peanuts by George Washington Carver", as compiled by the Carver Museum. Date N/A.*
Payne, D. "Peanut Flour: Its Development, Manufacture and Utilization"; The Bakers Digest; Presented to the ACS on Apr. 20–23, 1942. pp. 285–286.*
"Peanuts for Shortening in Bakery Products", The Peanut Journal and Nut World, p. 14, author unknown; Aug. 1943.*

* cited by examiner

Primary Examiner—Keith Hendricks

(57) ABSTRACT

A method of using peanut products in conjunction with a pancake mix, in a unique way (via peanut flour, peanut butter, peanut chunks, peanut oil and peanut essence) to create a nutritious, aromatic, new food product. This is accomplished by mixing all of these ingredients with water, milk, buttermilk and/or club soda to provide a batter, and cooking, which produces the final product of tender, fluffy, and peanut crunchy inside, crispy on the outside, pancakes. The product freezes well and can be eaten cold or subsequently reheated for consumption.

5 Claims, No Drawings

"PEANUT BUTTER BATTER" PANCAKE MIX

A delicious, nutritious, unique new food product, made with real peanuts, peanut butter, peanut chunks, peanut flour, peanut oil.

Everyone who like peanut butter will love "Doris Lorraine's Peanut Butter Pancake Batter" Pancake Mix. It looks great, the aroma is wonderful, and tastes even better, with extraordinary appetite appeal. You get the delectable taste thrill of peanut butter and peanut chunks right in your pancakes. Cooks up tender, fluffy and peanut crunchy inside; crispy on the outside. Tastefully attractive to everyone from children to adults.

Garnish with butter or other spreads, syrups, sugar, honey, jams and preserves, applesauce, bananas, sour cream, and all varieties of fruit.

Try it!!! You're sure to come back for more.

For further information and samples of product, packaging and pricing, please contact:

Doris Lorraine Buck, President/CEO

Doris Lorraine Foods, Inc.

11-A Via Castilla, Laguna Hills, Calif. 92653

Phone: (949) 457-1033 or Fax: (949) 457-1036

A combination of peanut ingredients including, but not limited to, peanut flour, peanut butter, peanut chunks, peanut oil, peanut extract, integrated with a pancake mix.

Uses:

Pancakes

Waffles

Crepes

Doughnuts

Peanut Butter Batter Bread

Fruit in the mix:
  Apples
  Bananas
  Peaches
  Blueberries
  Raspberries
  Chocolate chips
  Etc.

As a coating for:
  Meats
  Fish
  Poultry
  Etc.

In soups, sauces, dressing, etc.

"PEANUT BUTTER BATTER" Pancake Mix

| FORMULA: (suggested)* | |
| --- | --- |
| Peanut Extract | 1.0 |
| Peanut Butter | 4.7 |
| Peanut Oil | 0.5 |
| Peanut Chunks | 10.1 |
| Peanut Flour | 20.0 |
| Ascorbic Acid | 0.2 |
| Leavening | 1.0 |
| Salt | 0.5 |
| Eggs (Powdered) | 1.0 |
| Buttermilk Powder | 6.0 |
| Whey | 6.0 |
| Dextrose | 9.0 |
| Sugar | 17.0 |
| All purpose Flour | 23.0 |
| | 100.00 |

*To be used as is, or with necessary changes to fit indicated uses as shown

What is claimed is:

1. A peanut butter batter pancake mix, which comprises:

(a) a combination of peanut ingredients comprising peanut flour, peanut butter, peanut chunks, peanut oil and peanut extract oil and (b) a flour-based pancake mixture.

2. A method of using the peanut butter batter pancake mix of claim 1, comprising forming doughnuts, waffles, or crepes with the peanut butter batter pancake mix as a base.

3. A method of using the peanut butter batter pancake mix of claim 1, comprising forming a bread with said peanut butter batter pancake mix as a base.

4. A method of using the peanut butter batter pancake mix of claim 1, comprising coating meats, fish, or poultry with said peanut butter batter pancake mix as a base.

5. A method of using the peanut butter batter pancake mix of claim 1, comprising thickening soups, sauces, and dressings with said peanut butter batter pancake mix.

* * * * *